Oct. 9, 1934.                S. EINSTEIN                1,976,119
                            GRINDING MACHINE
                         Filed Nov. 22, 1930
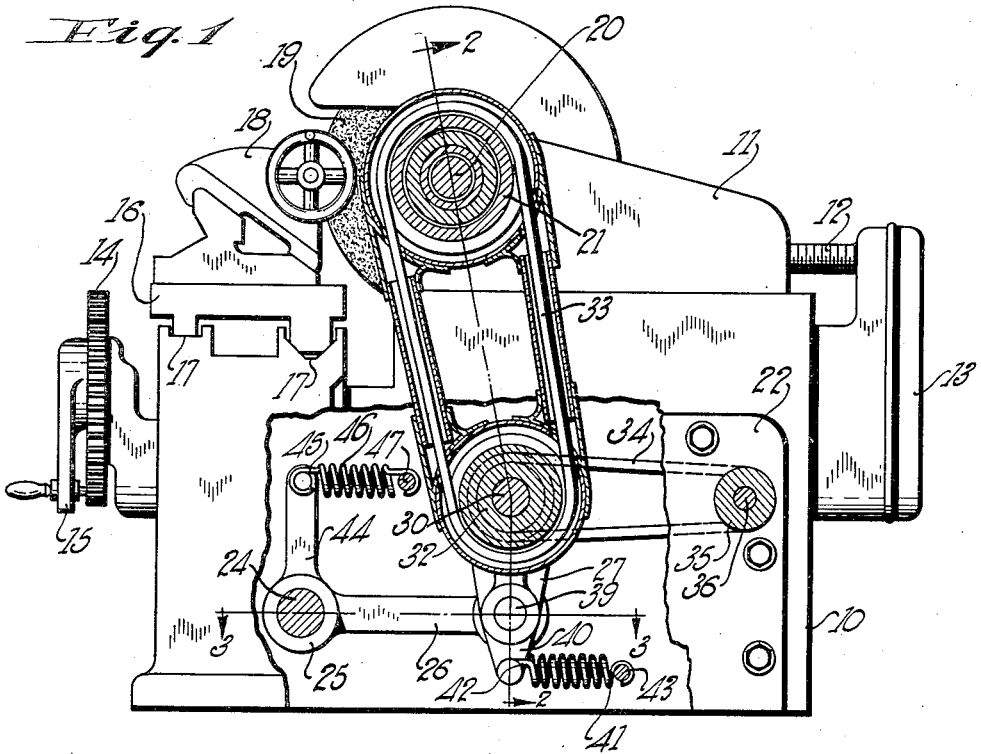
Inventor
SOL EINSTEIN
By H. K. Parsons
Attorney Patented Oct. 9, 1934

1,976,119

UNITED STATES PATENT OFFICE 1,976,119

GRINDING MACHINE

Sol Einstein, Cincinnati, Ohio, assignor to Cincinnati Grinders Incorporated, Cincinnati, Ohio, a corporation of Ohio Application November 22, 1930, Serial No. 497,513

9 Claims. (Cl. 51—166)

This invention relates to improvements in machine tools and especially to improvements in a mechanism for driving tool carrying spindles and the like.

An object of the invention is the provision of improved means for maintaining proper driving tension in belts employed for transmitting motion or power to a shiftable shaft spindle or the like.

Another object of the invention is the provision of an improved belt drive mechanism, including improved mechanism for automatically tensioning the belts of the drive without the use of idler pulleys.

Other objects and advantages of the present invention should be readily apparent by reference to the accompanying drawing forming a part thereof, and it is to be understood that any modifications may be made in the exact structural details there shown and disclosed in the accompanying specification, within the scope of the appended claims, without departing from or exceeding the spirit of the invention.

In the drawing:

Figure 1 is an end elevational view of a machine tool embodying the improvements of this invention, certain parts being broken away to more clearly illustrate the construction.

Figure 2 is a sectional view taken on line 2—2 of Figure 1.

Figure 3 is a sectional view on line 3—3 of Figure 1.

Throughout the several views of the drawing similar reference characters are employed to denote the same or similar parts.

The invention has been illustrated in the drawing in conjunction with a grinding machine, but it is to be understood that the same is capable of general use, and is not to be restricted to grinding machines except as so restricted by the claims.

The device embodying this invention may comprise a bed 10 having formed at its upper end suitable ways for supporting a tool carriage 11 shiftable transversely of the bed 10 by any suitable or desirable means such as the adjusting screw 12. The adjusting screw 12 is journaled in a bracket 13 containing the mechanism for operatively actuating the screw 12 which is effected through the usual pick feed mechanism, including the ratchet 14 or manually by the lever 15. The tool carriage 11 is shiftable toward and from a work supporting table 16 suitably guided in its movement longitudinally of the bed 10 by guide ways 17. The table supports work between the usual headstock and tailstock 18 for operation thereon by a grinding wheel or other tool 19 carried by the carriage 11, a spindle 20 being provided on which is secured the grinding wheel or tool 19 and which spindle is suitably rotatably journaled in the tool carriage 11.

The said spindle 20 has secured to its outer end a sheave or pulley 21 of the multiple belt type. Secured to the side of the bed 10 is a plate 22 having a bearing 23, see Figure 3, in which is secured a stud 24 forming a bearing for bell crank 25. Pivotally secured to one end of arm 26 of bell crank 25 is a bearing bracket 27 having bearing sleeve 28 integral therewith. This sleeve 28 carries anti-friction bearings 29 on which is journaled a shaft 30 having secured to opposite ends a silent chain pinion 31 and a sheave or belt pulley 32. The sheave or belt pulley 32 is of multiple groove type and is positioned in underlying relation to the spindle pulley 21. Belts 33 are trained about the said pulleys 21 and 32.

The silent chain pinion 31 on the end of intermediate or driven shaft 30 has trained thereon a driving chain 34 which in turn extends about a similar drive pinion 35 on jack shaft 36 receiving power from any suitable or desirable source, such as a line shaft motor or the like. From the foregoing it will be noted that power is received from any suitable source by the jack shaft 36 and transmitted therefrom through driving chain 34 to the intermediate shaft 30 which in turn is coupled through transmission belts 33 with the spindle 20 for rotating or driving the tool 19 carried thereby. In the past considerable difficulty has been experienced in maintaining the proper driving tension in the belts 33 and chain 34, and heretofore resort has been had to idler pulleys or the like for maintaining this tension, which has been eliminated by the present invention.

As seen in Figure 2, it will be noted that the bearing bracket 27 includes arms 37 depending from the bearing sleeve 28 which are tied by cross bar 38 below the pivot shaft 39, and terminate in a tongue 40 extending therefrom. A spring 41 having one end 42 secured to the tongue 40 and the other end secured to a stud 43 extending from the plate 22 is provided for oscillating the bearing bracket 27 about the pivot 39. By this construction the spring 41 tends to rotate the intermediate shaft 30 in a counter-clockwise direction, as viewed in Figure 1, about the axis of the pivot shaft 39, thereby maintaining the desired tension in the chain 34. By reference to Figure 1 it will be noted that the bell crank 25 has a second arm 44 extending upwardly above the pivot 24 and has secured to the end of this arm one end 45 of a tension spring 46 having its other end secured to a stud 47 extending from the plate 22. This spring 46 tends to rotate the bell crank 25 in a clockwise direction about the axis of pivot stud 24 tending to so rotate the pivot shaft 29, bearing bracket 27, and intermediate shaft 30, thereby tensioning the belts 33.

From the foregoing it will be noted that springs 41 and 46 tend to rotate the intermediate shaft 30 in a direction away from the axis of jack shaft 36 and spindle 20 thereby constantly maintaining the proper driving tension in the belts 33 and chain 34. In operation the tool carriage 11 is actuated toward and from the work supporting table 16 to permit, first a replacement of the work between the head and tail stocks 18 and to effect a feeding movement of the tool relative to the work. This shifting of the tool carriage would tend to shorten the distance between the axes of the intermediate shaft 30 and spindle 20, which tendency is overcome by springs 41 and 46 each tending to shift the said intermediate shaft 30 in the proper direction away from the axes of jack shaft 36 and spindle 20 to maintain proper desired driving tension in the belts.

What is claimed is:

1. In a mechanism of the class described the combination of a bed, a tool carriage carried thereby and shiftable relative thereto in a horizontal plane, a spindle carried by the carriage, a belt pulley on the spindle, a source of power, an intermediate shaft, transmission means between the source of power and intermediate shaft, transmission means between the intermediate shaft and the spindle, and means tending to oscillate the intermediate shaft about a plurality of axes and in directions away from the axes of the source of power and the spindle for automatically maintaining the driving tension in each of the transmission means.

2. In a mechanism of the class described the combination of a shiftable carriage, a spindle rotatably mounted therein, a pulley on the spindle, a countershaft, a pulley on the countershaft in underlying relation to the spindle pulley, belt transmission means between the pulleys, means for floatingly mounting the countershaft on the bed whereby movement of the carriage oscillates the countershaft, means for yieldingly actuating the countershaft about its floating mounting in a direction opposite to that in which it is moved by the carriage to maintain proper driving tension in the belt transmission, said means comprising a belt crank pivotally mounted on the bed at the juncture of its arms, a bracket on one arm supporting the countershaft, and a spring on the other arm for actuating the bell crank about its pivot.

3. In a grinding machine the combination of a bed, a reciprocating tool carriage carried thereby and reciprocable relative thereto in a horizontal plane, a spindle rotatably supported by the carriage, a belt pulley on the spindle, a driven shaft, a pulley on the driven shaft, belt transmission means between the pulleys for transmitting motion from the driven shaft to the spindle, a pivotally mounted bracket supporting the driven shaft, means for reciprocating the carriage and spindle, means for oscillating the driven shaft and bracket about the pivot for maintaining driving tension in the belt during the shifting of the carriage, a source of power, transmission means between the source of power and the driven shaft, the axes of the source of power and spindle being positioned radially of the axis of the driven shaft, and means for further oscillating the driven shaft for maintaining proper driving tension in the transmission means from the power source.

4. In a mechanism of the class described the combination of a bed, a spindle carried thereby and shiftable in a horizontal plane relative thereto, a driven shaft, a source of power, transmission means between the source of power and the driven shaft and between the driven shaft and spindle, the axes of the spindle and driven shaft lying in a common plane, the axes of the driven shaft and source of power lying in a second plane which intersects the plane of the spindle and driven shaft axes and having the driven shaft disposed at the point of intersection of said planes, means supporting the driven shaft for movement in directions away from the axes of the spindle and power source for providing proper driving tension in the transmission means, said means comprising a bracket revolvably supporting the driven shaft, means pivotally mounting the bracket for movement in a direction away from the axis of either the spindle or the source of power, and additional means for mounting the bracket, driven shaft and pivot of the bracket for oscillation in a direction away from the other of the axes of the spindle and source of power.

5. In a belt drive mechanism for horizontally shiftable spindles the combination of a belt pulley on the end of a spindle, a driven shaft, a belt pulley on the end of the driven shaft, transmission belts between the pulleys, a source of power, transmission means between the source of power and the driven shaft, a bracket for the driven shaft, a bell crank having a pair of arms each extending at right angles to the other, means pivotally mounting the bracket to the end of one of the bell crank arms, yielding means for actuating the bracket about its pivotal mounting away from the source of power for maintaining driving tension in the transmission means extending therefrom, means pivotally mounting the bell crank, and additional means engaging the other arm for oscillating the bell crank about its pivot for actuating the driven shaft in a direction away from the spindle for maintaining proper driving tension in the belt transmission extending from the spindle.

6. In a belt drive mechanism for grinding machines the combination of a bed, a slide mounted thereon for movement relative thereto, a grinding wheel spindle rotatably journaled in the slide, a belt pulley secured to the spindle, a supporting plate secured to the bed beneath the grinding wheel slide, an oscillatable bracket carried by the plate, a second bracket carried by the oscillatable bracket, a driven shaft rotatably journaled in said second bracket, a power source including a shaft carried by the plate, flexible transmission means between the power source shaft and driven shaft, flexible transmission means between the driven shaft and spindle, and means independently operable on said oscillatable bracket and second bracket for shifting the driven shaft away from the spindle and power source shaft for tensioning the several flexible transmission means.

7. In a belt drive for grinding machines the combination with a bed, of a grinding wheel slide mounted thereon for movement relative thereto, a source of power, a spindle rotatably journaled in the slide, a driven shaft intermediate the source of power and spindle, flexible transmission means between the source of power and driven shaft, flexible transmission means between the driven shaft and spindle, and means supporting said driven shaft for oscillation simultaneously in two directions away from both the spindle and power source for thereby automatically tensioning said two flexible transmissions, said means comprising a pivotally mounted bracket in which the driven shaft is journaled, additional means pivotally supporting the bracket and anchored to the bed, and means tending to simultaneously oscillate the bracket and driven shaft in a direction away from either the spindle or power source and oscillate the additional means with the bracket away from the other of the spindle or power source.

8. In a belt drive for grinding machines the combination with a bed, of a grinding wheel slide mounted thereon for movement relative thereto, a source of power, a spindle rotatably journaled in the slide, a driven shaft intermediate the source of power and spindle, flexible transmission means between the source of power and driven shaft, flexible transmission means between the driven shaft and spindle, and means supporting said driven shaft for oscillation simultaneously in two directions away from both the spindle and power source for thereby automatically tensioning said two flexible transmissions, said means comprising a plate carried by the bed, a bell crank pivotally mounted on the plate, a bracket pivotally carried by one arm of the bell crank in which is rotatably mounted the driven shaft, and means simultaneously oscillating the bell crank and parts carried thereby and bracket and parts carried thereby in opposite directions for thereby actuating the driven shaft away from the spindle and power source for tensioning the several flexible transmissions.

9. In a belt drive for grinding machines the combination with a bed, of a grinding wheel slide mounted thereon for movement relative thereto, a source of power, a spindle rotatably journaled in the slide, a driven shaft intermediate the source of power and spindle, flexible transmission means between the source of power and driven shaft, flexible transmission means between the driven shaft and spindle, and means supporting said driven shaft for oscillation simultaneously in two directions away from both the spindle and power source for thereby automatically tensioning said two flexible transmissions, said means comprising a plate carried by the bed, a bell crank pivotally mounted on the plate, a bracket pivotally carried by one arm of the bell crank in which is rotatably mounted the driven shaft, spring means operable on the remaining arm of the bell crank for oscillating same and parts carried thereby about its pivot away from the spindle and thereby tensioning the flexible transmission between the driven shaft and spindle, and yielding means operable on the bracket for actuating same away from the power source and thereby tensioning the flexible transmission between the driven shaft and power source.

SOL EINSTEIN.